US010753525B2

(12) United States Patent
Hofer et al.

(10) Patent No.: US 10,753,525 B2
(45) Date of Patent: Aug. 25, 2020

(54) ASEPTIC PIPELINE PIG WITH IDENTIFICATION MEANS (71) Applicant: URESH AG, Biel-Benken (CH)

(72) Inventors: Urs Hofer, Therwil (CH); Andres Huber, Dornach (CH)

(73) Assignee: Uresh AG, Biel-Benken (CH)

( * ) Notice: Subject to any disclaimer, the term of this patent is extended or adjusted under 35 U.S.C. 154(b) by 10 days.

(21) Appl. No.: 15/108,932

(22) PCT Filed: Jan. 6, 2015

(86) PCT No.: PCT/EP2015/050118
§ 371 (c)(1),
(2) Date: Jun. 29, 2016

(87) PCT Pub. No.: WO2015/101676
PCT Pub. Date: Jul. 9, 2015

(65) Prior Publication Data
US 2016/0319980 A1 Nov. 3, 2016

(30) Foreign Application Priority Data
Jan. 6, 2014 (EP) .................... 14150246

(51) Int. Cl.
F16L 55/48 (2006.01)
B08B 9/055 (2006.01)
G01V 15/00 (2006.01)
F16L 101/12 (2006.01)

(52) U.S. Cl.
CPC ............ *F16L 55/48* (2013.01); *B08B 9/0551* (2013.01); *B08B 9/0554* (2013.01); *G01V 15/00* (2013.01); *F16L 2101/12* (2013.01)

(58) Field of Classification Search
CPC ... B08B 9/0551; B08B 9/0557; B08B 9/0553; B08B 9/055; F16L 55/48; F16L 2101/12; F16L 55/26
USPC ................. 134/8, 166 C, 166 R; 15/104.062, 15/104.05, 104.001
See application file for complete search history.

(56) References Cited

U.S. PATENT DOCUMENTS 4,767,603 A 8/1988 Byrd
5,400,456 A 3/1995 Skibowski
(Continued)

FOREIGN PATENT DOCUMENTS

CN 2357844 1/2000
CN 202742591 U * 2/2013
(Continued)

OTHER PUBLICATIONS

International Search Report PCT/EP2015/050118.
(Continued)

*Primary Examiner* — Nadine G Norton
*Assistant Examiner* — Christopher Remavege
(74) *Attorney, Agent, or Firm* — Hoxie & Associates LLC (57) ABSTRACT A pipeline pig (5) for cleaning pipelines (6) and/or for recovering products from a pipeline is disclosed. The pipeline pig (5) comprises at least one radiofrequency identification tag (4a, 4b) as a means for identification and for the sending, receiving and storing of data. The pipeline pig (5) may be used in pipeline systems used for the production of sterile food or pharmaceutical products.

18 Claims, 4 Drawing Sheets

(56) References Cited

U.S. PATENT DOCUMENTS

| | | | | |
|---|---|---|---|---|
| 7,850,893 B2* | 12/2010 | Chisholm | ......... | B29C 45/14065 |
| | | | | 264/272.11 |
| 8,094,027 B2* | 1/2012 | Yang | ................. | B29C 45/14008 |
| | | | | 235/375 |
| 8,325,047 B2* | 12/2012 | Marur | .............. | G06K 19/07749 |
| | | | | 235/492 |
| 9,563,834 B2* | 2/2017 | Imbruglio | .............. | G06K 19/02 |
| 10,076,609 B2* | 9/2018 | Ashby | ................ | A61M 5/31513 |
| 2005/0230110 A1* | 10/2005 | Ellison | .................. | E21B 17/006 |
| | | | | 166/255.1 |
| 2009/0013806 A1* | 1/2009 | Miller | ...................... | F16L 55/48 |
| | | | | 73/865.8 |
| 2009/0111393 A1* | 4/2009 | Scalisi | .............. | B29C 45/14639 |
| | | | | 455/90.1 |
| 2011/0103189 A1 | 5/2011 | Paulson | | |
| 2011/0282591 A1 | 11/2011 | Cogen | | |
| 2012/0007714 A1 | 1/2012 | Muehlin | | |
| 2012/0042903 A1 | 2/2012 | Mousa | | |
| 2013/0276828 A1* | 10/2013 | Phipps | .................. | B08B 9/0551 |
| | | | | 134/8 |

FOREIGN PATENT DOCUMENTS

| | | |
|---|---|---|
| CN | 202742591 U | 2/2013 |
| CN | 203044448 | 7/2013 |
| CN | 103481567 A | 1/2014 |
| DE | 19733531 C2 | 2/1999 |
| DE | 19820783 A1 | 9/1999 |
| DE | 102005059023 A1 | 6/2007 |
| EP | 0666448 B1 | 10/2002 |
| EP | 2039440 A1 | 3/2009 |
| EP | 1950525 B1 | 8/2009 |
| EP | 2159574 A2 | 3/2010 |
| EP | 2159574 B1 | 9/2011 |
| JP | H07052019 A | 2/1995 |
| JP | H08105905 A | 4/1996 |
| JP | H09133286 A | 6/1997 |
| JP | H09192620 A | 7/1997 |
| JP | 2001009402 A | 1/2001 |
| JP | 2001307055 A | 11/2001 |
| JP | 2002224875 A | 8/2002 |
| JP | 2003-154354 A | 5/2003 |
| JP | 2004147967 A | 5/2004 |
| JP | 2008048616 A | 3/2008 |
| JP | 2011227755 A | 11/2011 |
| WO | 9710943 A1 | 3/1997 |
| WO | 0176780 A1 | 10/2001 |
| WO | 2005100733 A1 | 10/2005 |
| WO | 2007015901 A1 | 2/2007 |
| WO | 2007020475 A1 | 2/2007 |
| WO | 2010120189 A2 | 10/2010 |
| WO | 2010120189 A3 | 10/2010 |
| WO | 2012123993 A1 | 9/2012 |
| WO | 2013044290 A1 | 4/2013 |
| WO | 2013079695 A1 | 6/2013 |
| WO | 2013095143 A1 | 6/2013 |

OTHER PUBLICATIONS

Translation of office action in corresponding Japanese Patent Application No. 2016-562069, dated Sep. 3, 2018, Examiner Yasuaki Yamauchi 9255 3K00.

English Abstract and English Machine Translation of Chinese Patent No. 103481567 A, "Biomass polymer hybrid laminated composite material and preparation method," obtained via Espacenet, date obtained: Jun. 24, 2019, 38 pages.

English Abstract and English Machine Translation of Chinese Patent No. CN 202742591 U, "Rubber injection molding vulcanizing machine," obtained via Espacenet, date obtained: Aug. 20, 2019, 17 pages.

\* cited by examiner

ASEPTIC PIPELINE PIG WITH IDENTIFICATION MEANS

CROSS-REFERENCE TO RELATED APPLICATIONS

This application is a U.S. National Stage Application filed under 35 U.S.C. § 371 of International Application No. PCT/EP2015/050118, filed on Jan. 6, 2015, which claims priority to, and the benefit of, European Application No. 14150246.8, filed on Jan. 6, 2014, the contents of each of which are incorporated herein by reference in their entireties.

BACKGROUND

The application of pipeline pigs to clean, survey, and inspect pipeline systems is widespread over a number of different industrial fields. In the food and pharmaceutical industry, pigs (also known as pipeline scraper or mole) are typically employed for pipeline cleaning, and are used as an aid or means to push or scrape out or transport remaining products or residue materials in a pipeline. This helps to significantly reduce the quantities of cleaning fluid required for purging and flushing remnants out of the pipeline system such as before a subsequent manufacturing step. In some cases, pigs may also be used to recover valuable product from the line. Aseptic processing is typically a standard requirement for food industry and especially the pharmaceutical industry, leading to the development of pigging systems in which the pig is usually not physically removed from the system for inspection or for cleaning of the pig.

A reliable method for the detection, monitoring of a pig and its status and/or positioning within a pipeline system is consequently an essential feature for implementing aseptic pigging systems, especially for those designed without any means for visible inspection.

To locate them, pipeline pigs known in the art are often devised with one or more permanent magnet components. Such pigs are detected when they trigger magnetic field sensors fitted along the pipeline. For example, U.S. Pat. No. 5,400,456 describes an embodiment of a pig/pipeline scraper as comprising a centrally located, cylindrical permanent magnet, and another embodiment in which there are a plurality of permanent magnets circumferentially spaced around the annular groove portions of the scraper. The magnetic field generated by these are used to excite a detector located in a pipeline wall which indicates the presence of the scraper. An example of a position detector and system for detecting magnet-fitted pigs moving in a pipeline is described in EP1950525B1.

Such magnetic field-based positioning and detecting systems are capable of providing information regarding the location of a pig at a fixed time point i.e. at the time of detection. No information, however, can be provided by these systems as to other important data about the pig such as the identity of the pig or status information such as the time of its first launch. Other methods for providing data with respect to the location and status of the pig have been described in the art. For instance, pipeline pigs with acoustic or electromagnetic field-based communication systems have been disclosed. These pigs are typically used for inspecting, isolating or cleaning large pipelines such as water, sewage or oil pipes and usually also comprise sensors for measuring physical properties of the pipe and pipe environment.

For example, WO 2010/120189 describes a high-friction pig, such as those constructed for sealing off and isolating a selected part of a subsea oil pipeline, with a transponder for tracking and real-time monitoring. The pig moves when there is sufficiently high differential pressure across the pig; it forms a seal when at rest in the pipeline based on friction between the pig material and pipeline wall. The system allows two-way electromagnetic communication between the transponder mounted on the pig and a transceiver outside the pipeline. Each transponder is given a unique identification number, which is communicated to the transceiver; enabling an operator using the transceiver to track the pig's travel through the pipeline, and e.g. to determine when the pig has reached a pre-determined location in the pipeline. Further, the transponder in such pigs is configured to receive data from pig-mounted sensor(s) which monitor and acquire data on physical properties of the pipeline such as pressure or temperature upstream and downstream of the pig e.g. to ensure that the pig is properly in place and properly sealing the pipeline.

DE 10 2005 059 023 discloses a pipeline pig provided with a signal receiver/transmitter device that is useful for transporting media, in particularly fluid media, within a pipeline. The signal receiver/transmitter device provides a means for identifying the pig; however, this function works only when the pig is used in a pipeline system incorporating at least one special pipeline section with a 'window or port' made of a material such as glass that is permeable or transparent to electromagnetic field signals (e.g. radio waves). In other words, identification of the pig is only possible when the pig passes by or stops at this particular pipeline section which has external to it an interrogation signal transmitter unit. Such a pipeline pig is therefore severely limited in that it may not be used in any pre-existing pipeline set-ups that do not have such windows, at least not without necessitating significant pipeline re-design and additional costs. In addition, information such as the position of the pig at any other locations within a pipeline cannot be readily determined.

Moreover, DE 10 2005 059 023 does not specifically disclose the use of such a pig for aseptic processing, nor whether such a pig incorporating a communications device may be able to withstand harsh processing or sterilization conditions, for example, its ability to withstand steam-autoclaving for extended periods of time.

A pipeline pig that is suitable for use in aseptic processing, and that incorporates at least one transponder or radio-transmitting/receiving device as a control means for the positioning of the pig within the pipeline has not yet been made commercially available. A sales brochure with limited technical information from the applicant of DE 10 2005 059 023 describes a pig for product recovery and separation incorporating permanent magnets that is further equipped with a read-only (RO) transponder. This pipeline pig however relies on the presence of the magnets for positioning. The transponder device is only for identification purposes; it is not disclosed how the read-only transponder may be used to provide 'complete documentation' as indicated in the brochure, such as to collect, transmit or retain data such as with respect to the location of the pig or the environment surrounding the pig. It is also not disclosed how the transponder may be incorporated so as to avoid the potentially disturbing influence of the magnets that are also present within the pig on the transponder.

WO 2005/100733 describes cementing plug (or pipeline pig) for oil pipelines with one or more radio frequency identification (RFID) tags (read-only or read-write) for identification purposes. The RFID-tags may be embedded in a recess of the plug and/or affixed exteriorly to the plug. In order to protect the RFID tag(s) from shocks (pressure, impacts, thermal)—as may be encountered in a wellbore or during drilling and which may lead to failure of the RFID tag(s)—the tags are held in place by and encased in a heat resistant glue or adhesive, e.g. epoxy material. In addition, they are covered with further heat and/or impact resistant materials which are either wrapped around the circumference of the plug's body (e.g. RYTON® wrap) or in the form of a cap ring (e.g. made of magnetic or nonmagnetic metals, plastic, composite, polytetrafluoroethylene, fiberglass, ceramic, and/or cermet.) corresponding to and closing off the recess. Alternatively, the RFID-tags may be encased in a ring of protective material whose shape and configuration corresponds to the shape of the recess.

Irrespective of how the RFID tag is affixed to the pig, though, the fixing would inevitably result in surface imperfections such as ridges or creases where the different materials of the pig and the heat-protective material meet. While this may not cause many concerns in oil pipelines, such surface imperfections are highly undesirable for aseptic work conditions; they are harder to clean and facilitate microbial growth. Same applies e.g. to the very common shape of the wipers of the cementing plugs in WO 2005/100733; rendering most oil pipeline pigs unsuitable for aseptic work conditions.

Unlike the signal receiver/transmitter device in DE 10 2005 059 023, RFID tags do not require a transparent or permeable window to allow the identification of the pig. However, food- or pharma pipeline pigs are far smaller than oil pipeline pigs such as those described in WO 2005/100733. In consequence, permanent magnets (as currently used for the positioning of the pig in food and pharmaceutical industry) would get far closer to an RFID-chip than it would be the case in large oil pipeline pigs and thus increasingly interfere with the RFID's function. Due to this problem, RFID tags commonly have been disregarded for food- or pharma pipeline pigs.

It is therefore the object of the current invention to provide a pipeline pig for cleaning a pipeline or for pipeline product recovery comprising at least one radiofrequency identity tag which overcomes at least one of the problems or limitations associated with prior art pigs, in particular a permanent magnet-free pipeline pig comprising at least one radiofrequency identity tag as a positioning and monitoring means for the pig within the pipeline and also as an identification and/or data-collecting means which may be subjected to sterilization conditions and other high temperature and high pressure processing conditions. Another object is to provide a method for identifying, monitoring and/or positioning of a pipeline pig used for aseptic processing. Other objects will become clear on the basis of the description and the claims.

SUMMARY OF THE INVENTION

The present invention provides a pipeline pig for cleaning a pipeline or for product recovery from a pipeline comprising an axially symmetrical, elongate main body of solid material shaped to have at least two axially spaced sealing surfaces for sealing the pig against the interior surface of the pipeline, characterized in that the pig comprises at least one radiofrequency identification tag. In one aspect, the pipeline pig is free of permanently magnetic materials.

In a further aspect, the invention provides a method for identifying, monitoring and/or positioning a pipeline pig for cleaning a pipeline or for product recovery. The radiofrequency identification tag comprised in the pipeline pig comprises a non-volatile memory on which information, e.g. relating to the identity of the pig and its use within a pipeline, is storable. The tag also enables the determination of the position of the pig within the pipeline.

In another aspect, the pipeline pig comprises two or more radiofrequency identification tags.

In yet another aspect, the pipeline pig of the invention is autoclavable and is useful for aseptically cleaning a pipeline or useful for aseptically recovering products from a pipeline.

Further aspects and embodiments will become clear on the basis of the detailed description, the drawings and the claims.

DETAILED DESCRIPTION

In a first aspect, the present invention provides a novel pipeline pig for cleaning or for product recovery, characterized in that the pig comprises at least one radiofrequency identification (RFID) tag fully encased in the pig's main body material. In particular, the pipeline pig comprises an axially symmetrical, elongate main body of solid material shaped to have at least two axially spaced sealing surfaces for sealing the pig against the interior surface of the pipeline.

The pipeline pig for cleaning and product recovery comprising a radiofrequency identification tag as described herein facilitates the identification and localisation of a pipeline pig within a pipeline and provides a method for the collecting and monitoring of data such as data relevant for determining the life-cycle status of the pipeline pig.

The radiofrequency identification tag provides a means for identifying the pig within the pipeline system and is particularly useful if there is more than one pig deployed in a pipeline system. Pipeline pigs for cleaning pipelines and for product recovery also tend to deteriorate over time from exposure to processing conditions and from friction and abrasion against the residue materials and pipeline walls. As such, it is highly advantageous to be able to monitor their usage over time, e.g. so as to determine their appropriate lifetime within a pipeline system. This is particularly relevant in context of aseptic processing, since retrieval of a pig from a sterile system, for e.g. visual inspection to evaluate its status, is impractical and may lead to contamination incidences. In contrast, a pipeline pig of the invention comprising at least one radiofrequency identification tag comprising a non-volatile memory storage would not need to be retrieved from the pipeline system, or be moved to a specific location providing visual access. Rather, data regarding the identity of the pipeline pig i.e. information such as but not limited to its manufacture date, time of first launch, etc. may be retrieved remotely using a radiofrequency identification tag reader at any given position along the pipe.

It has been surprisingly found that the pipeline pig of the invention may be subjected to harsher conditions such as high pressures and high temperatures without deteriorating the function of the radiofrequency identification tag or loss of its memory storage. In particular, the pipeline pig is amenable to sterilization conditions required for pipeline pigs used for aseptic cleaning or product recovery processes and is autoclavable at high temperatures, such as 121° C. or even higher.

As used herein, a pipeline pig is a device suitable for moving along the inside of a pipeline in order to facilitate the transportation or recovery of material in the pipeline, to inspect the pipeline, to clean it, or to seal off parts of the pipeline temporarily. A pipeline pig is sometimes also referred to as a pipeline gauge, scraper or mole, and may correspond to various types of pipes and pipe diameters. The internal pipe diameter may be in the range from about 1.5 cm to 35 cm for the pipes commonly used in food- and/or pharmaceutical industry. Typically, the largest diameter of a pig is only minutely smaller than the inner diameter of the corresponding pipeline, such as to allow movement of the pig, but also to enable the pig to push material through the pipe or to scrape material away from the surface of the inner pipeline wall. The pig is propelled or driven through the pipeline by fluid pressure i.e. gaseous or liquid or a combination of both.

In the main embodiment of the invention, a pipeline pig for cleaning a pipeline or for product recovery comprises an axially symmetrical, elongate main body of solid material shaped to have at least two axially spaced sealing surfaces for sealing the pig against the interior surface of the pipeline; and at least one radiofrequency identification tag fully encased in the main body's solid material. This means that the solid material surrounds, or engulfs, the complete radiofrequency identification tag; i.e. all sides of the tag are covered by the main body's solid material.

The solid material used for the main body of the pipeline pig, or at least its surface, is preferably selected from silicone rubber or a polyurethane material; e.g. a two-component silicon-caoutchouc-system based on reactive silicon polymers and filler additives. In a particularly preferred embodiment, the pipeline pig comprises of an axially symmetrical elongate main body of silicone rubber, wherein the silicone rubber is prepared from cross-linking a least one silicone polymer or elastomer precursor in the presence of at least one filler additive and at least one curing agent. Particularly preferred is addition-crosslinking of the silicone polymers or elastomer precursors where no decomposition or cleavage products are formed. The silicone rubber is a physiologically non-hazardous material, and is temperature resistant and chemically inert.

The silicone rubber or polyurethane material is sufficiently resilient and elastic to enable the main body of the pipeline pig to provide a sufficient degree of sealing for scraping or pushing product residue away from the pipeline wall (whether for cleaning or product recovery purposes) but not to the degree where movement along a pipeline would be prevented or slowed down. The pipelines in which the pig may be used may have variations in diameter, surface material and texture, and geometry, i.e. pipelines are not necessarily directionally linear and may be subject to directional changes such as bends or curves. The main body material of the pig is sufficiently flexible and is, moreover, preferably shaped to accommodate or overcome such deviations.

In the main embodiment of the invention, the axially symmetrical, elongate main body of the pipeline pig is shaped to have at least two axially spaced sealing surfaces for sealing the pig against the interior surface of the pipeline. As understood herein, axially symmetric refers to the symmetry in the shape of the pig across its longitudinal centre axis, said axis being parallel to the pipeline in which the pig is placed. For the avoidance of doubt, the symmetry does not include the spatial arrangement of components inside the pig, but only the shape of its outer surface. The main body of the pipeline pig is also elongate, or as understood in context of the invention, having a length greater than at least its cross-sectional width or diameter.

The sealing surface refers to the surface region of the pig in contact with the interior surface of the pipeline wall. The sealing surfaces are spaced, relative to one another, axially along the longitudinal axis of the pig. The sealing surfaces circumferentially form the sections of the elongate main body with the largest cross-sectional diameter. The sealing surfaces are in constant or near constant contact against the pipeline interior wall and provide sealing against the interior surface of the pipe wall. This allows for the scraping or pushing of product or materials remaining on the pipeline wall when the pipeline pig is moved along the pipe, resulting in the cleaning the pipeline or recovering product from the pipeline.

Figure 1:
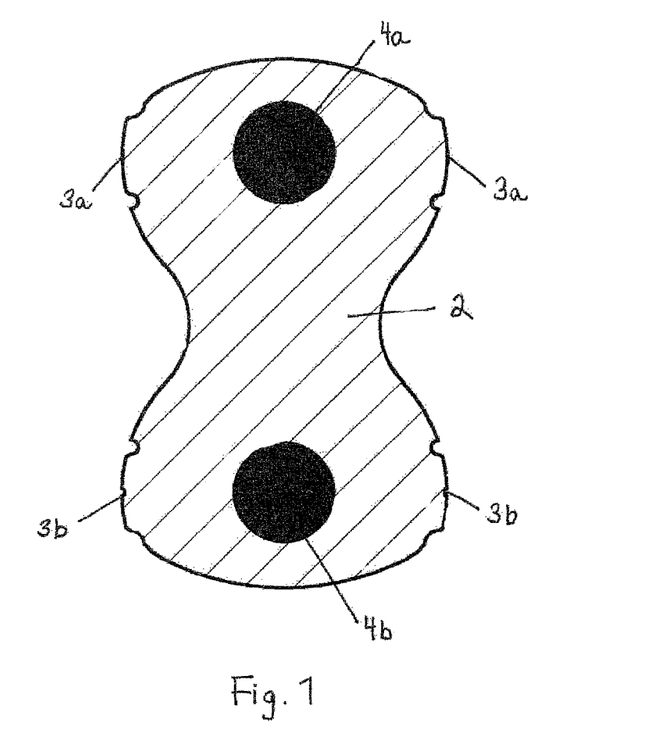
FIG. 1 shows a longitudinal cross-section of a preferred embodiment of the pipeline pig with two radiofrequency identification tags.

In a preferred embodiment of the invention, the axially symmetrical, elongate main body of the pipeline pig is shaped to consist of two axially spaced sealing surfaces for sealing the pig against the interior surface of the pipeline. Preferably, the two axially spaced sealing surfaces are equidistantly spaced from the horizontal (with reference to the orientation shown in FIG. 1) centre axis (or plane) of the elongate main body of the pig, i.e. the axis (or plane) perpendicular to the longitudinal centre axis; one at, or close to, the upstream end of the pig and one at, or close to, the downstream end of the pig. Alternatively, the pig main body may be shaped to have more than two axially spaced sealing surfaces. In an optional embodiment, the pig main body may be shaped to have at least three, or at least four or at least six axially spaced sealing surfaces. Preferably, the axially spaced sealing surfaces are grouped symmetrically with respect to the centre axis of the pig; for example, a pig main body shaped with four axially spaced sealing surfaces may have two axially spaced sealing surfaces on either side of the centre of the pig. In a further optional embodiment, the axially spaced sealing surfaces may comprise of a solid material different to that of the main body. In order to allow for aseptic working conditions as well as sufficient ease of cleaning and autoclavability, the number and shape of the sealing surfaces should be selected carefully. Numerous and narrowly spaced small sealing surfaces such as the so-called 'wipers' commonly seen with oil pipeline pigs are typically harder to clean than e.g. a pig according to the invention as depicted in FIG. 1 with only two sealing surfaces spaced fairly wide apart. Preferably, the pig of the invention is free of such "wipers" and any narrowly spaced surface structures and/or structures forming small angles (e.g. below 60°) with the outer surface of the main body of the pig. This is preferred for aseptic working conditions in order to reduce the risk of product residues and/or microbial matter getting trapped, or stuck, in between or underneath such surface structures.

The pipeline pigs of the invention may be subjected to sterilization; e.g. before introduction into or use within a sterile pipeline, or pipeline system. In particular, the pipeline pig of the invention comprising at least one radiofrequency identification tag are further characterized in that it is autoclavable at 121° C. for at least 20 minutes. Autoclaving involves subjecting the pig to high pressure steam for a period of time. In other embodiments, the pipeline pig according to the invention may be autoclavable at 115° C. for at least 40 minutes, or at 132° C. for at least 5 minutes. As such, the pipeline pig of the invention comprising at least one radiofrequency identification tag can be used for aseptically cleaning a pipeline and/or for aseptically recovering products from a pipeline.

The outer surface of the main body of the pipeline pig is preferably seamless and smooth; with a low friction coefficient and good resistance to wear. Such seamless, smooth surfaces result in reduced adhesion of pipeline products and/or reduced microbial adhesion; thus being preferred for aseptic working conditions. In a preferred embodiment, the pipeline pig of the invention comprising at least one radiofrequency identification tag comprises an axially symmetrical, elongate main body of solid material, wherein the outer surface of the main body exhibits an average roughness of less than 2 µm. Further preferred embodiments are pipeline pigs with average outer surface roughness of less than 1.5 µm, or less than 1.0 µm, or less than 0.5 µm. In one of the particularly preferred embodiments, the average surface roughness is less than 0.1 µm. Also preferred are pipeline pigs with axially symmetrical, elongate main bodies of silicone rubber or polyurethane with average outer surface roughness of less than 1.5 µm, or of less than 1.0 µm, or less than 0.5 µm, or less than 0.1 µm.

The pipeline pigs of the invention may be suited for pipelines of different diameters. In a preferred embodiment, a pipeline pig of the invention comprising at least one radiofrequency identification tag has a largest cross-sectional diameter in the range from 1 cm to 30 cm. Further preferred are pipeline pigs having a largest cross sectional diameter of the range from 4 cm to 25 cm, or from 5 cm to 20 cm. Also preferred are pipeline pigs having a largest cross-sectional diameter of less than about 20 cm, or less than about 18 cm, or less than about 16, or less than about 14 cm.

As mentioned, the pipeline pig comprises at least one radiofrequency identification tag. More specifically, the at least one radiofrequency tag is fully encased within the main body of the pipeline pig; i.e. the solid material of the main body surrounds, or engulfs, the complete radiofrequency identification tag such that all sides of the tag are covered by the main body's solid material. Typically, none of the components of the RFID tag are in contact with the pig's outer surface, or disrupt this surface, resulting in the best possible shock and temperature protection for the RFID tag as well as in a seamless and smooth surface of the pig, as preferred for aseptic working conditions. In one embodiment, the pipeline pig comprising an axially symmetrical elongate main body of solid material is directly formed or shaped over the at least one radiofrequency tag, by means of, for example, injection-moulding. The liquid or molten precursor composition to the solid material (e.g. rubber silicone or polyurethane) of the pipeline pig is directly added into a mould comprising at least one radiofrequency identification tag, and is vulcanized or cured to form the main body of the pipeline pig. In a preferred embodiment, this vulcanisation step is performed under vacuum in order to reduce the amount of bubbles in the moulded materials to a minimum and thereby achieve optimally smooth surfaces on the pig. The resulting main body is seamless with the at least one radiofrequency identification tag being fully encased within the solid material of the main body; the solid material forming a continuous single phase (in which the RFID tag is fully encased) with a smooth, seamless outer surface. In one embodiment, the at least one RFID tag is positioned at, or close to, the longitudinal centre axis of the pig; as depicted e.g. in FIGS. 1 to 3.

Preferably, the pipeline pig of the invention comprises two or more radiofrequency identification tags. In a particularly preferred embodiment, the pipeline pig consists of two radiofrequency identification tags. The two radiofrequency identification tags may be positioned at, or close to the longitudinal centre axis of the pig. The two radiofrequency identification tags may further be positioned at equidistance from the horizontal (with reference to the orientation shown in FIG. 1) centre axis (or plane) of the elongate main body of the pig, i.e. the axis (or plane) perpendicular to the longitudinal centre axis, with a tag positioned at, or within, each end portion of the pig main body; e.g. as depicted e.g. in FIGS. 1 and 2. The presence of at least two radiofrequency identification tags provides a means for identifying and differentiating a 'front' end and a 'back' end of the pipeline pig that may be otherwise longitudinally and centrally symmetrical. This may be particularly useful, for instance for moving the pig into a defined rest position within the pipeline.

According to another embodiment, a pipeline pig of the invention is free of permanently magnetic materials. The use of permanent magnets in pipeline pigs is a conventional technique for detecting and locating a pig in a pipeline system that is however, not without disadvantages. For instance, the manufacture of magnetic pigs, especially those with a plurality of magnets may require greater precision in terms of placement of the magnet and proper arrangement of their poles. A pig comprising permanent magnetic materials also does not provide any practical means for its identification. Visual identification would be possible, but this necessitates retrieval from the pipeline system, which is not ideal if it is an aseptic pipeline system. A pipeline pig of the invention being free of permanently magnetic materials avoids these limitations. The presence of permanent magnetic material could cause, in any case, interference with the function of the radiofrequency identification tag. In contrast to magnetic pigs, the pipeline pigs of the invention comprising at least one radiofrequency identification tag provide identification means for the pipeline pig. The radiofrequency identification tag not only serves to identify the pig (e.g. via a unique identifier (UID)), but also enables the determination of the position of the pig within the pipeline, remotely via one or more radiofrequency identification reader(s) at any given position along the pipeline. This further allows deliberately positioning the pig within the pipeline or pipeline system; e.g. positioning the pig in the pig cleaning and/or autoclaving station, the pig launcher or in a defined rest position within the pipeline. In a specific embodiment, the cleaning and/or autoclaving stations may be identical to the pig launcher.

In another embodiment, the pipeline pig comprises at least one radiofrequency identification tag, wherein the at least one radiofrequency tag transmits a directional radiofrequency signal. The radiofrequency tag transmits and/or receives a signal in a single direction, or unidirectionally, rather than transmitting and/or receiving signals in all directions, or non-directionally. It has been found that incorporation of at least one directional radiofrequency identification tag in a pipeline pig allows for improved control and precision in the positioning of said pig within the pipeline. Non-directional radiofrequency identification tags in contrast do not allow for such precision. Surprisingly, directional radiofrequency identification tags permit the precise positioning of the pipeline pigs to at least the same/similar degree as, or even better than, with conventional pipeline pigs incorporating magnetic materials, however without the limitations of the conventional magnetic pigs.

The radiofrequency identification tag fully encased within the main body of the pipeline pig of the invention is an independent unit comprising an integrated circuit (IC), a non-volatile memory, a means for receiving and/or transmitting a radiofrequency signal or communication from and/or to a radiofrequency identification reader and a housing. The radiofrequency identification tag may also be referred to as a transponder. Stored in the non-volatile memory of the radiofrequency identification tag is unique identifier (UID), i.e. unique identifying information that is transmitted to the radiofrequency identification reader. In one embodiment, the radiofrequency signals transmitted to or received by the radiofrequency identification tag are in the HF (high frequency) range.

In a further embodiment, the radiofrequency identification tag incorporates a means for receiving and/or transmitting a radiofrequency signal or communication from and/or to a radiofrequency identification reader comprising an external coiled antenna. The antenna is situated exterior to the housing of the radiofrequency identification tag. The radiofrequency identification tag comprising such an antenna is still fully encased within the main body of the pipeline pig. In another embodiment, the antenna may be situated interior to the housing.

As mentioned earlier, the at least one RFID tag may be positioned at, or close to, the longitudinal centre axis of the main body of the pig. Optionally, the radiofrequency identification tag may be positioned on one side of the horizontal with reference to the orientation shown in FIG. 1) centre axis (or plane) of the elongate main body of the pig, e.g. at, or within, one of the end portions of the pig as depicted, for instance, in FIG. 3.

The antenna of the radiofrequency identification tag may be a directional antenna that transmits or receives a signal in a single direction or unidirectionally. Preferably, the antenna is capable of transmitting and receiving radiofrequency signals. In one embodiment, the antenna is shaped as a coil situated exterior to the housing of the RFID tag, although is not limited as such; alternative coil shapes and positions with respect to the radiofrequency identification tag housing are within the scope of the invention.

According to the invention, the housing of the radiofrequency identification tag has high temperature resistance. In addition to the solid material of the pig's main body, the housing protects the components of the radiofrequency identification tag against temperature extremes and from potential external contaminants (e.g. during injection moulding of the pig). Preferably, the radiofrequency identification tag comprises a housing which is heat resistant up to at least 125° C. In other embodiments, the housing is heat resistant up to at least 250° C. In an optional embodiment, the housing is also cold resistant up to at least −25° C. or even −40° C.

The housing may be constructed from materials such as metal (e.g. laser-welded stainless steel) or synthetic plastic (e.g. liquid crystal polymer (LCP)). In one embodiment, the housing has a shape of a cylindrical disk, with a diameter in the range of 1.5 cm to 5.5 cm.

In a further preferred embodiment, the radiofrequency identification tag is passive, i.e. does not incorporate a battery. The passive radiofrequency identification tag may rely on energy generated from the proximity of an alternating magnetic field produced by the radiofrequency identification reader. In other optional embodiments, the radiofrequency identification tag comprises a local power source, such as a battery, which may be constantly active, resulting in periodic transmission of a signal to the reader or which may be activated when communicated to by the radiofrequency identification reader.

Optionally, the pipeline pig may comprise a sensor for measuring temperature and/or a sensor for measuring pressure, in which case the sensor is connected to the radiofrequency identification tag. Optionally, these sensors may also be located exterior to the pig, e.g. within, or close to, the walls of the pipeline. Irrespective of the position of the sensors, the radiofrequency identification tag receives data from the sensor and can store the data in its non-volatile memory. The data is transmitted in the form of a signal to the radiofrequency identification reader. For example, the temperature internal and/or external to the pig may be recorded and transmitted during autoclave sterilization of the pig.

The radiofrequency identification reader in the context of the invention is a device capable of reading at least one signal emitted by the radiofrequency identification tag comprised in the pipeline pig. There may be more than one radiofrequency identification reader along a pipeline or pipeline system, i.e. a plurality of readers. As used herein, a plurality means more than one, or at least two. The radiofrequency identification reader comprises a radiofrequency transceiver unit, which is capable of transmitting signals to the radiofrequency identification tag comprised in the pipeline pig and receiving signals from the radiofrequency identification tag, including signals providing unique identifying information of the pipeline pig.

In an embodiment, the radiofrequency identification reader comprises a radiofrequency transceiver unit, wherein the radiofrequency transceiver unit directionally transmits signals. The radiofrequency transceiver unit transmits a signal in a single direction, or unidirectionally, rather than transmitting signals in all directions, or non-directionally, and/or receive signals from a single direction, rather than all directions. In yet another embodiment, the radiofrequency identification reader comprises a radiofrequency transceiver unit, wherein said unit is capable of receiving signals from at least one radiofrequency tag transmitting a directional radiofrequency signal.

According to another embodiment, the radiofrequency identification reader comprises a non-volatile, read-writable memory. In another aspect, the radiofrequency identification reader may comprise a data processing unit or may be connected to a data processing unit. With such read-write RFID tags incorporated in the pig, the pig—apart from its cleaning and/or product recovery action—may further be employed to monitor, or store, process data such as pressure and/or temperature values while being in the pipeline; e.g. during the autoclaving.

The radiofrequency identification reader is placed in proximity to the pipeline outer wall, and may be placed at any position along the pipeline in a pipeline system. The operating distance between the transceiver unit of the radiofrequency identification reader and the outer wall of the pipe will depend on the pipe material and pipe wall thickness. In one embodiment, no special window or pipeline section from different material from the rest of the pipeline is used at the position of the radiofrequency identification reader. In one embodiment, the radiofrequency identification reader is placed directly in contact with the pipeline outer wall, or is positioned within the range of 1-3 cm away from the outer wall of the pipeline.

The invention further provides a method for identifying, monitoring and/or positioning a pipeline pig for cleaning a pipeline or for product recovery, comprising: (a) providing at least one radiofrequency identification tag having a memory on which information relating to the identity of the pig and/or further information, such as the time of its first launch and/or temperature data, is storable; (b) providing a plurality of radiofrequency identification readers capable of reading the stored information from the memory of the radiofrequency identification tag at the plurality of positions along the pipeline; (c) incorporating the radiofrequency identification tag within the pipeline pig, (d) allowing the plurality of radiofrequency identification tag readers to read the unique identifying information from the memory of the radiofrequency identification tag at the plurality of positions of the radiofrequency identification tag readers, and (e) using the thereby determined data to monitor the pig's use and/or to position the pig at at least one target position within the pipeline.

The target position for the pig may, for instance, be the pig cleaning and/or autoclaving station, the pig launcher, a rest position or any other position of interest within the pipeline, or the pipeline system. In a specific embodiment, the cleaning and/or autoclaving stations may be identical to the pig launcher.

The radiofrequency identification tag comprised in the pipeline pig comprises a non-volatile memory on which information relating to the identity of the pig and/or further information, such as the time of its first launch and/or temperature data, is storable. In general, information which may be stored in the non-volatile memory, and which may be relayed to the radiofrequency identification reader upon interrogation, includes identifying information of the pig, such as the unique identifier (UID) or, for example, the date of manufacture of the pipeline pig (i.e. data typically stored already on the memory prior to first use of the pig), as well as further information, such as the time of first launch, the number of running cycles in the pipeline, process-or operating data measured by sensors (e.g. pressure and/or temperature within the pipeline and/or within the pig, etc. (i.e. data stored on the memory upon, or during, use of the pig). Like this valuable information related to the pig and its use may be recorded and monitored; e.g. during autoclaving.

As mentioned earlier, the pipeline pig may further comprise one or more sensors connected to the radiofrequency identification tag for measuring temperature and/or pressure. Optionally, such sensor(s) may also be located exterior to the pig, e.g. within, or close to the walls of the pipeline. Irrespective of the position of the sensors, data received from such sensor(s) may be stored in the RFID tag's non-volatile memory and transmitted to the radiofrequency identification reader. This provides a means and method to record and monitor e.g. the temperature internal and/or external of the pig during autoclave sterilization cycles of the pig.

The radiofrequency identification tag comprised in the pipeline pig also enables the determination of the position of the pig within the pipeline, and thereby provides a method of positioning the pig at any desired target position within the pipeline. For example, the passing of a pipeline pig comprising a radiofrequency identification tag by a reader at a given location can provide a record of the time in which the pig reached or passed said location as well as how often it reached or passed said location. Thereby, the at least one radiofrequency identification tag comprised in the pipeline pig provides a method for monitoring the status of the pig and enables the determination of other parameters such as run-time (e.g. over its lifetime in use in the pipeline system and/or for a given run), resting time, speed of travel or its acceleration over a given length of pipeline.

Figure 2:
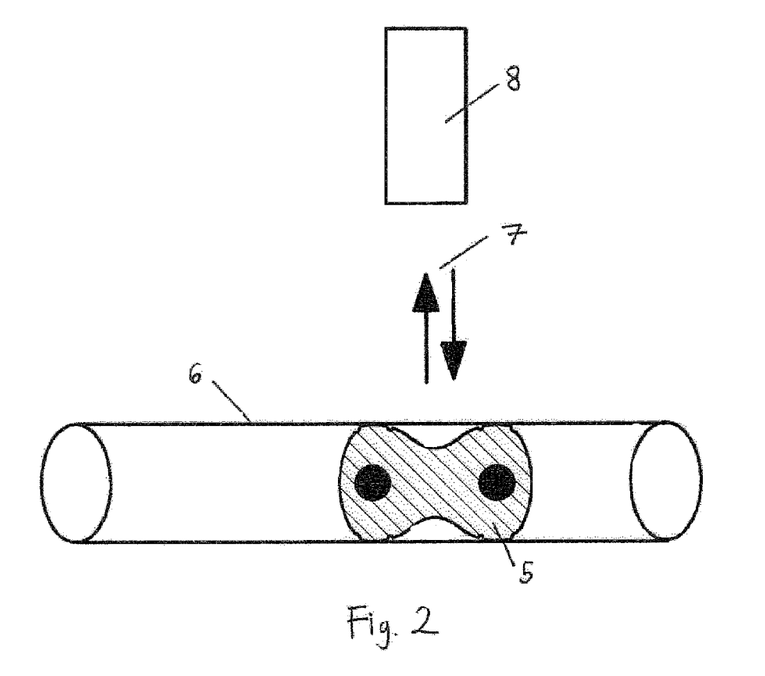
FIG. 2 depicts a pipeline system with a pipeline pig comprising two radiofrequency identification tag in a pipeline (both shown in longitudinal cross-section), and a radiofrequency identification reader.

More than one radiofrequency identification readers may be comprised in a pipeline system and/or positioned along a pipeline. As mentioned above, the pipeline pig of the invention preferably comprises two or more radiofrequency identification tags, in particular two tags at, or within, each end portion of the pig, as depicted in FIGS. 1 and 2. The presence of at least two radiofrequency identification tags provides a means for identifying and differentiating a 'front' end and a 'back' end of the pipeline pig that may be otherwise longitudinally and centrally symmetrical. This may be particularly useful, for instance for moving the pig into a defined rest position within the pipeline.

As mentioned above, the pipeline pigs of the invention may be subjected to sterilization; e.g. before introduction into a sterile pipeline, or pipeline system, and also while inside the pipeline's autoclaving station. Therefore, the invention also encompasses the use of the pipeline pig of the invention for aseptically cleaning a pipeline and/or for aseptically recovering products from a pipeline.

Pipeline systems useful for practicing the invention are in particular those which are used in the food and pharmaceutical industries for transporting media such as raw materials, or intermediate or final products. The raw materials or products may be in the form of fluids, such as a liquid or a gas or a combination thereof, or may even be semi-solids or highly viscous liquids. In one embodiment, the pipeline system is sterile inside, and is used to transport a food or pharmaceutical material aseptically.

In context of the invention, the term pipeline system refers to any assembly comprising a pipeline, and includes components internally located within the pipeline (e.g. a pipeline pig) as well as components which may be externally located outside of the pipeline but functionally connected to the pipeline (e.g. a sensor, gauge or data reader). Accordingly, within the scope of the invention is a pipeline system comprising: (a) a pipeline, (b) a pipeline pig of the invention and (c) a radiofrequency identification reader capable of reading at least one signal emitted by the radiofrequency identification tag comprised in the pipeline pig.

As used herein, the term 'a' is not restricted to the singular, but may also refer to a plurality of components or assemblies, for instance, a pipeline pig may also refer to a plurality of pipeline pigs.

Further optional embodiments and optional features of the invention are disclosed in the drawings.

FIG. 1 shows a longitudinal cross-section of a pipeline pig according to a preferred embodiment of the invention. The pipeline pig has an axially symmetric elongate main body (1), and a central area (2) with contracted diameter. The contracted diameter is selected so as to accommodate the pig running through a pipeline bend. The pipeline-facing ends of the elongate main body of the pipeline pig are slightly convex. The pipeline pig has two sealing surfaces (3a, 3b) circumferentially forming the sections of the elongate main body with the largest cross-sectional diameter. The diameters of the sealing surfaces (3a) and (3b) are selected so as to contact the pig to the interior surface of the pipeline, such that the cross-sectional diameter of the section comprising the sealing surfaces is only marginally smaller than the diameter of the interior surface of the pipeline. The pipeline pig comprises two radiofrequency identification tags (4a) and (4b) fully encased within the main body (1). The radiofrequency identification tags (4a) and (4b) may each comprise unique identification information. They are positioned equidistantly from the horizontal (with reference to the orientation shown in FIG. 1) centre axis (or plane) of the elongate main body at the end portions of the pig, i.e. the axis (or plane) perpendicular to the longitudinal centre axis of the pig.

FIG. 2 shows the same pipeline pig (5), but in a pipeline (6), and in proximity to an externally located radiofrequency identification reader (8). The radiofrequency identification reader is positioned in proximity to the pipeline so as to be within operating range and distance to the pipeline pig passing through the pipeline and so as to permit two-way communication (7) between the reader and the radiofrequency identification tags encased within the pig body. The pipeline pig comprising two radiofrequency identification tags is able to receive an interrogating signal transmitted from the radiofrequency identification reader (8) and respond by transmitting a reply signal, which is received by the reader.

Figure 3:
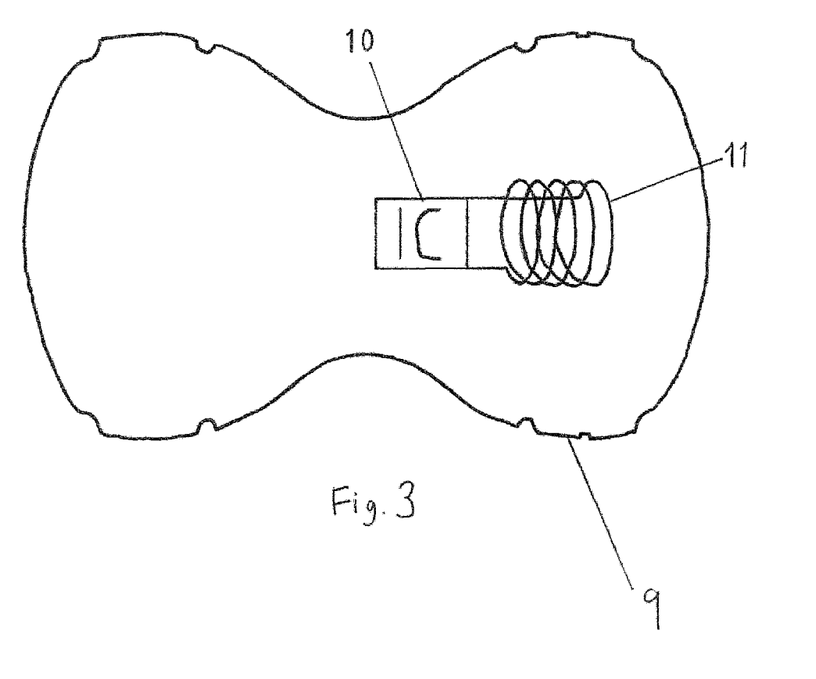
FIG. 3 depicts a longitudinal cross-section of another preferred embodiment pipeline pig comprising at least one radiofrequency identification tag with a coiled directional antenna.

FIG. 3 shows a longitudinal cross-section of a pipeline pig according to another preferred embodiment of the invention, comprising at least one radiofrequency identification tag (10) fully encased within the main body (9) of the pipeline pig. The radiofrequency identification tag (10) comprises a coiled directional antenna (11).

Figure 4:
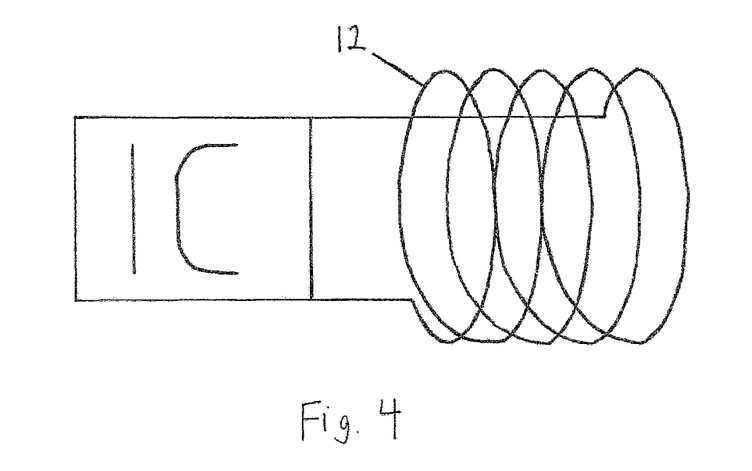
FIG. 4 shows a radiofrequency identification tag for use in pipeline pigs comprising an external coiled antenna.

FIG. 4 shows a radiofrequency identification tag for use in pipeline pigs comprising an external coiled antenna (12).

Figure 5:
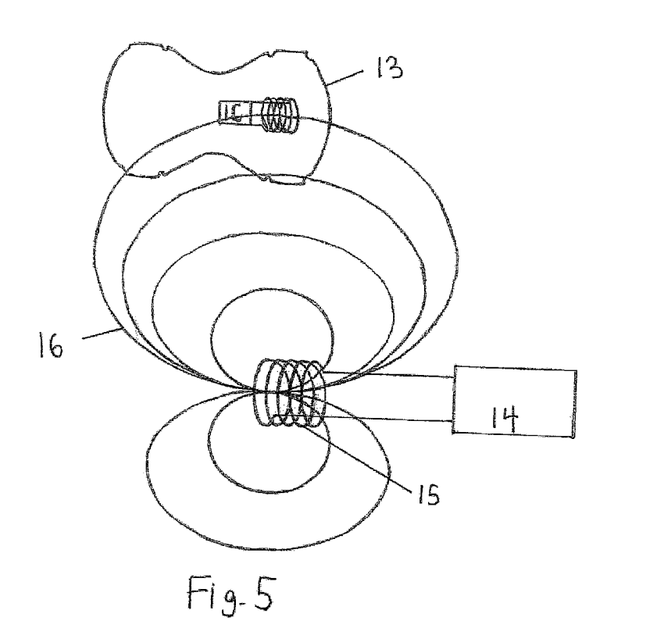
FIG. 5 depicts a pipeline pig with a radiofrequency identification tag comprising an external coiled antenna interacting with a radiofrequency identification reader.

FIG. 5 shows the interaction between a pipeline pig of the invention (13) comprising a radiofrequency identification tag comprising an external coiled antenna and a radiofrequency identification reader (14) when in proximity with one another. The radiofrequency identification reader is also equipped with a coiled antenna (15), which may be receive and transmit signals directionally or at all directions. The radiofrequency identification reader generates an alternating magnetic field (16) which can transmit data and power to the radiofrequency identification tag comprising an external coiled antenna.

The invention claimed is:

1. A pipeline pig for cleaning a pipeline or for product recovery comprising an axially symmetrical, elongate main body of solid and sterilizable material shaped to have at least two axially spaced sealing surfaces for sealing the pig against the interior surface of the pipeline, characterised in that the pig comprises at least one radiofrequency identification tag fully encased within the solid material of the main body,
    wherein the main body of solid material is directly formed or shaped over the at least one radiofrequency identification tag, and
    wherein a liquid or molten precursor composition to the solid material is directly added into a mould comprising the at least one radio frequency identification tag and is vulcanized to form the main body, and wherein this vulcanization step is performed under vacuum, and wherein the pipeline pig is suitable for aseptically cleaning a pipeline.

2. The pipeline pig of claim 1, being free of permanently magnetic materials.

3. The pipeline pig of claim 1, wherein the solid material of the body forms a continuous single phase with a smooth, seamless outer surface.

4. The pipeline pig of claim 1, wherein the radiofrequency identification tag comprises a non-volatile memory on which information relating to the identity of the pig and/or further information is storable.

5. The pipeline pig of claim 1, wherein the radiofrequency identification tag comprises a housing which is heat resistant up to at least 125° C.

6. The pipeline pig of claim 1, wherein the radiofrequency identification tag enables the determination of the position of the pig within the pipeline.

7. The pipeline pig of claim 1, wherein the radiofrequency identification tag transmits a directional radiofrequency signal.

8. The pipeline pig of claim 1, comprising two or more radiofrequency identification tags.

9. The pipeline pig of claim 1, wherein the outer surface of the main body exhibits an average roughness of less than 0.1 µm.

10. The pipeline pig of claim 1, wherein the main body comprises of a silicone rubber or polyurethane material.

11. The pipeline pig of claim 1, having a largest cross-sectional diameter in the range from 1 cm to 30 cm.

12. The pipeline pig of claim 1, further characterised in that it is autoclavable at 121° C. for at least 20 minutes.

13. A method for identifying, monitoring and/or positioning the pipeline pig of claim 1 for cleaning a pipeline or for product recovery, comprising:
    (a) providing at least one radiofrequency identification tag having a memory on which information relating to the identity of the pig and/or further information is storable;
    (b) providing a plurality of radiofrequency identification readers capable of reading the identifying information from the memory of the radiofrequency identification tag at a plurality of positions along the pipeline;
    (c) incorporating the radiofrequency identification tag within the pipeline pig,
    (d) allowing the plurality of radiofrequency identification readers to read the stored information from the memory of the radiofrequency identification tag at the plurality of positions of the radiofrequency identification tag readers, and
    (e) using the thereby retrieved information to monitor the pig's use and/or to position the pig at at least one target position within the pipeline.

14. The use of the pipeline pig of claim 1 for aseptically cleaning a pipeline and/or for use in recovering product from a pipeline.

15. A pipeline system comprising:
    (a) a pipeline,
    (b) the pipeline pig of claim 1, and
    (c) a radiofrequency identification reader capable of reading at least one signal emitted by the radiofrequency identification tag comprised in the pipeline pig.

16. The pipeline pig of claim 1, wherein the main body of solid material is directly formed or shaped over the at least one radiofrequency identification tag by means of injection moulding.

17. The pipeline pig of claim 4, wherein the information relating to the identity of the pig and/or further information is the time of its first launch and/or temperature data.

18. The method of claim 13, wherein the information relating to the identity of the pig and/or further information is the time of its first launch and/or temperature data.

* * * * *